US012542117B1

(12) United States Patent
Wu

(10) Patent No.: US 12,542,117 B1
(45) Date of Patent: Feb. 3, 2026

(54) DISPLAY DRIVING DEVICE AND DISPLAY DRIVING METHOD FOR BRIGHTNESS ADJUSTMENT

(71) Applicant: HIMAX TECHNOLOGIES LIMITED, Tainan (TW)

(72) Inventor: Tung-Ying Wu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/938,273

(22) Filed: Nov. 6, 2024

(51) Int. Cl.
*G09G 5/10* (2006.01)

(52) U.S. Cl.
CPC ....... *G09G 5/10* (2013.01); *G09G 2320/0626* (2013.01); *G09G 2320/066* (2013.01); *G09G 2360/16* (2013.01)

(58) Field of Classification Search
CPC ............. G09G 5/10; G09G 2320/0626; G09G 2320/066; G09G 2360/16
See application file for complete search history.

(56) References Cited

U.S. PATENT DOCUMENTS

2004/0251842 A1* 12/2004 Kubota .................... G09G 5/10 348/E5.073
2006/0007250 A1* 1/2006 Jung .................... G09G 3/2944 345/690
2006/0125849 A1* 6/2006 Kubota .................... G09G 3/22 345/690
2022/0321973 A1* 10/2022 Chun .................... H04N 5/445

* cited by examiner

*Primary Examiner* — Rodney Amadiz
(74) *Attorney, Agent, or Firm* — JCIPRNET

(57) ABSTRACT

A display driving device and a display driving method are provided. The display driving device includes an image analysis module and a brightness adjustment module. The image analysis module analyzes a display data to determine a brightness boost region in a display image corresponding to the display data. The brightness adjustment module is coupled to the image analysis module. The brightness adjustment module executes a brightness boost operation corresponding to the brightness boost region, and calculates an accumulated time of the brightness boost operation. When the brightness adjustment module determines the accumulated time exceeds a first preset time length threshold, the brightness adjustment module executes a brightness dimming operation corresponding to the brightness boost region.

16 Claims, 3 Drawing Sheets

DISPLAY DRIVING DEVICE AND DISPLAY DRIVING METHOD FOR BRIGHTNESS ADJUSTMENT

BACKGROUND

Technical Field

The disclosure relates a display technology; particularly, the disclosure relates to a display driving device and a display driving method.

Description of Related Art

For a general self-illuminating display device, in order to improve the image contrast of display image, the general self-illuminating display device may boost (increase) the operation current of pixels to effectively increase the brightness. However, when operation current for driving the pixel is increased for a long time, the aging of the pixel may be accelerated.

SUMMARY

The disclosure provides a display driving device and a display driving method to achieve good display effects.

The display driving device of the disclosure includes an image analysis module and a brightness adjustment module. The image analysis module is configured to analyze a display data to determine a brightness boost region in a display image corresponding to the display data. The brightness adjustment module is coupled to the image analysis module. The brightness adjustment module is configured to execute a brightness boost operation corresponding to the brightness boost region. The brightness adjustment module is configured to calculate an accumulated time of the brightness boost operation. When the brightness adjustment module determines the accumulated time exceeds a first preset time length threshold, the brightness adjustment module is configured to execute a brightness dimming operation corresponding to the brightness boost region.

The display driving method of the disclosure includes the following steps: analyzing a display data to determine a brightness boost region in a display image corresponding to the display data; executing a brightness boost operation corresponding to the brightness boost region; calculating an accumulated time of the brightness boost operation; and when the accumulated time exceeds a first preset time length threshold, executing a brightness dimming operation corresponding to the brightness boost region.

Based on the above, according to the display driving device and the display driving method of the disclosure, the display driving device can effectively control the brightness boosting time length of the brightness boosting effect of the displayed image to effectively maintain luminous efficiency of the pixels in the panel of the display device.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
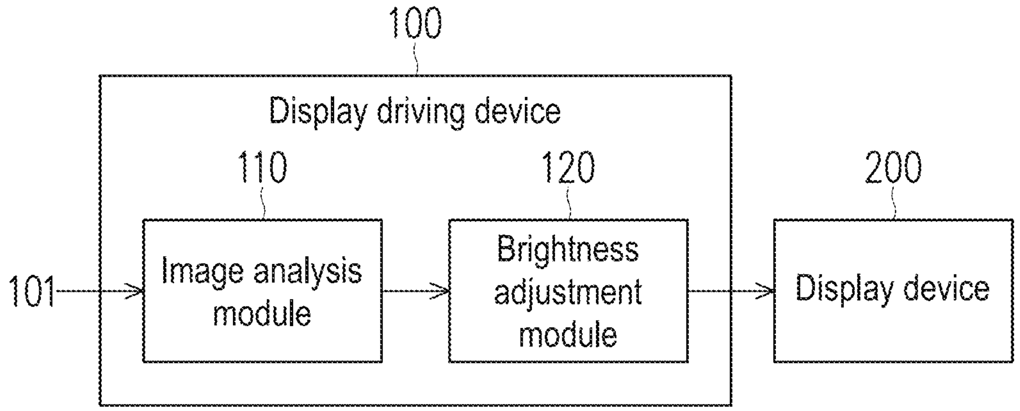
FIG. 1 is a schematic diagram of a display driving device according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . "

The term "coupling (or electrically connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device.

FIG. 1 is a schematic diagram of a display driving device according to an embodiment of the disclosure. Referring to FIG. 1, the display driving device 100 includes an image analysis module 110 and a brightness adjustment module 120. The image analysis module 110 is coupled to the brightness adjustment module 120. In the embodiment of the disclosure, the display driving device 100 may be a timing controller (TCON). The display driving device 100 may be configured to drive a display device 200. In one embodiment of the disclosure, the display device 200 may be an organic light-emitting diode display (OLED) device or a micro light-emitting diode (micro LED) display device, but the disclosure is not limited thereto. The display device 200 may include a self-illuminating display panel. In the embodiment of the disclosure, the display driving device 100 may receive a display data 101 from an image data source, and drive the display device 200 to display a corresponding display image according to the display data 101. Moreover, the display driving device 100 may perform brightness boost on the display image and effectively control the time length of the brightness enhancement period.

In the embodiment of the disclosure, the display driving device 100 may include a processing circuit and a memory. The processing circuit may be a field programmable gate array (FPGA), an application-specific integrated circuit (ASIC), or a micro-controller. The memory be a static random access memory (SRAM), a dynamic random access memory (DRAM), a synchronized dynamic random access memory (SDRAM), or a flash memory. In the embodiment of the disclosure, the memory may store the image analysis module 110 and the brightness adjustment module 120 for reading and executing by the processing circuit. In one embodiment, the image analysis module 110 and the brightness adjustment module 120 may also be implemented in the form of specific functional circuits.

Figure 2:
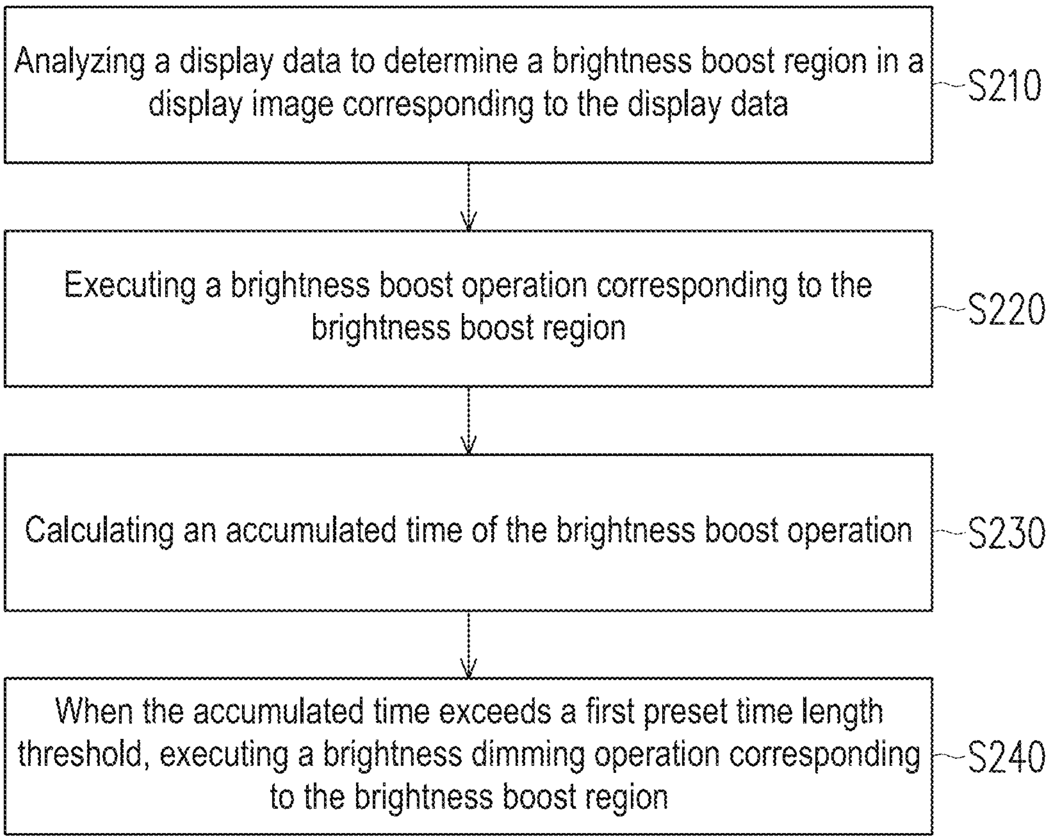
FIG. 2 is a flowchart of a display driving method according to an embodiment of the disclosure.
Figure 3:
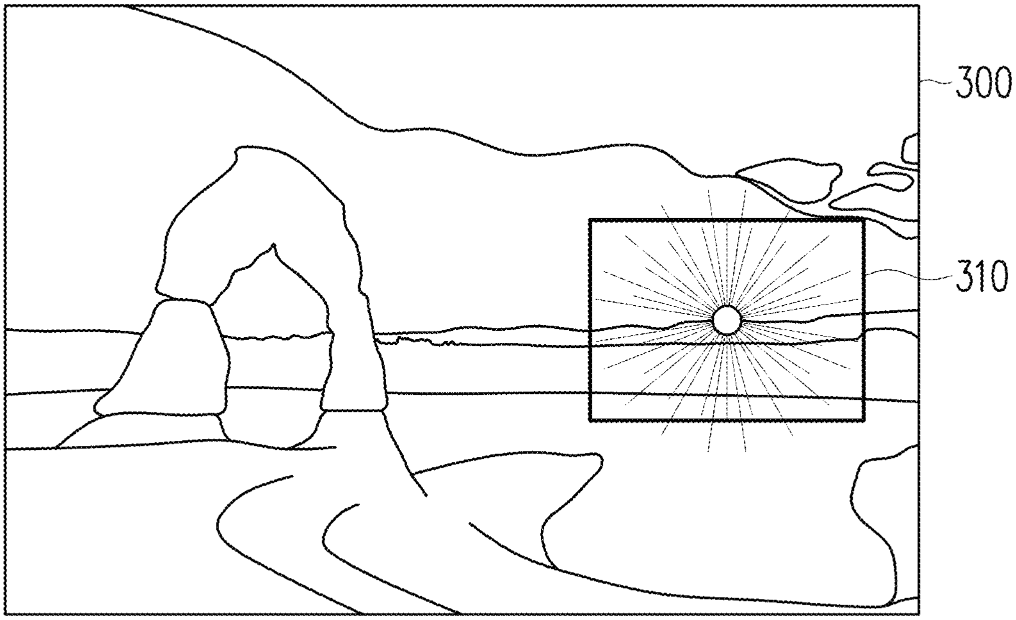
FIG. 3 is a schematic diagram of a display image according to an embodiment of the disclosure.

FIG. 2 is a flowchart of a display driving method according to an embodiment of the disclosure. FIG. 3 is a schematic diagram of a display image according to an embodiment of the disclosure. Referring to FIG. 1 to FIG. 3, the display driving device 100 may execute the following steps S210~S240. In the embodiment of the disclosure, the display driving device 100 may receive the display data. In step S210, the image analysis module 110 may analyze the display data 101 to determine a brightness boost region in a display image corresponding to the display data 101. In step S220, the brightness adjustment module 120 may executing a brightness boost operation corresponding to the brightness boost region. In step S230, the brightness adjustment module 120 may calculate an accumulated time of the brightness boost operation. In step S240, when the accumulated time exceeds a first preset time length threshold, the brightness adjustment module 120 may execute a brightness dimming operation corresponding to the brightness boost region.

In the embodiment of the disclosure, the image analysis module 110 may analyze the image data 101 to determine whether the display image corresponding to the image data 101 satisfies a brightness boost condition to define at least a part of the display image as the brightness boost region. In one embodiment of the disclosure, when the image analysis module 110 judges a number of pixels in the display image with grayscale values higher than a preset grayscale value is higher than a preset number threshold, the image analysis module 110 may determine the display image satisfies the brightness boost condition and defines a region with grayscale values higher than the preset grayscale value as the brightness boost region. Then, the brightness adjustment module 120 may execute the brightness boosting operation on pixels of the brightness boost region.

In the embodiment of the disclosure, the brightness adjustment module 120 may increase operation currents (e.g. increase the operation current to 20 mA (milliampere)) for driving pixels on at least a portion of a display panel (e.g. the self-illuminating display panel) of the display device 200 corresponding to the brightness boost region. Then, the brightness adjustment module 120 may accumulate the operation time of the brightness boosting operation to generate an accumulated time, and may determine whether the accumulated time exceeds a first preset time length threshold. When the brightness adjustment module 120 determines the accumulated time exceeds a first preset time length threshold, the brightness adjustment module 120 may execute the brightness dimming operation to reduce the operation currents for driving pixels on the at least a portion of the display panel of the display device 200 corresponding to the brightness boost region to normal currents (e.g. the normal current may be 10 mA).

In addition, during a period of the brightness dimming operation, in order to avoid obvious changes in the display image, the brightness of the brightness boost region in the display image may be gradually reduced to normal brightness. That is, the operation currents for driving pixels on the at least a portion of the display panel (e.g. the self-illuminating display panel) or for driving pixels on the at least a portion of the backlight panel (used for the non-self-illuminating display panel) may be gradually reduced to normal operation currents during a preset adjustment period.

Therefore, the image contrast of the display image can be effectively improved. Moreover, the display driving device 100 may effectively control the time length of the brightness boost period when the display device 200 displays the display image.

For example, as shown as FIG. 3, when the display device 200 displays the display image 300 (i.e. current frame), the image analysis module 110 may determine whether the display image 300 satisfies the brightness boost condition to define the brightness boost region 310. When the image analysis module 110 judges a number of pixels in the display image 300 with grayscale values higher than the preset grayscale value is higher than the preset number threshold, the image analysis module 110 may determine the display image 300 satisfies the brightness boost condition and defines a region with grayscale values higher than the preset grayscale value as the brightness boost region 310. In other words, the grayscale values of the pixels in the brightness boost region 310 may all be higher than the preset grayscale value, and the number of the pixels in the brightness boost region 310 may also be higher than the preset number threshold. Then, the brightness adjustment module 120 may execute the brightness boosting operation on pixels of the brightness boost region 310.

The brightness adjustment module 120 may increase operation currents for driving pixels on the at least a portion of the display panel (e.g. the self-illuminating display panel). Then, during a plurality of subsequent consecutive frames (in a static image or a dynamic image), the brightness adjustment module 120 may accumulate the operation time of the brightness boosting operation (continuous operation) to generate the accumulated time, and may determine whether the accumulated time exceeds the first preset time length threshold. When the brightness adjustment module 120 determines the accumulated time exceeds the first preset time length threshold, the brightness adjustment module 120 may execute the brightness dimming operation to gradually reduce the operation currents corresponding to the brightness boost region 310 to the normal operation currents during the preset adjustment period.

Therefore, the image contrast of the display image 300 can be effectively improved. Moreover, the display driving device 100 may effectively control the time length of the brightness boost period when the display device 200 displays the display image 300, thereby effectively avoiding the accelerated aging of pixels caused by over-driving.

Figure 4:
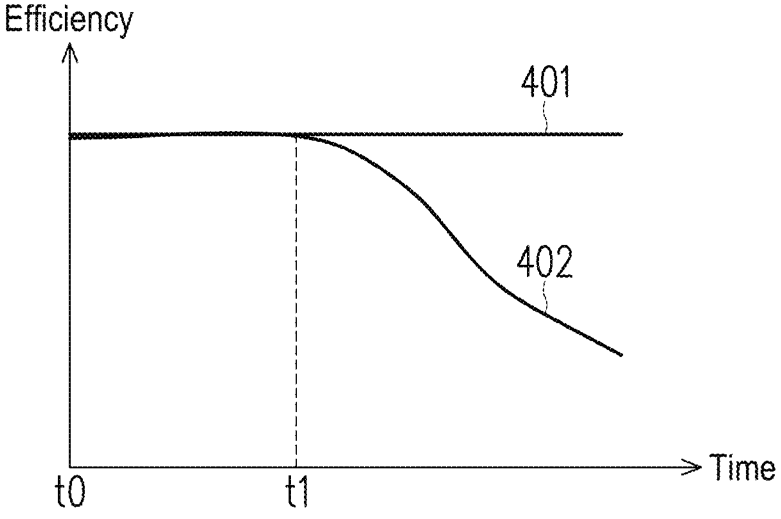
FIG. 4 is a schematic diagram of changes in display efficiency according to an embodiment of the disclosure.

FIG. 4 is a schematic diagram of changes in display efficiency according to an embodiment of the disclosure. Referring to FIG. 4, to further illustrate, taking one pixel of the panel as an example, if the pixel is driven by a normal operation current, as shown in the change of curve 401, the luminous efficiency of the pixel may be maintained for a long time. However, if the pixel is driven by a boosted operation current, as shown in the change of curve 402, the luminous efficiency of the pixel may begin to decrease at a threshold time t1 (i.e. pixel aging occurs). Therefore, the above first preset time length threshold may be defined as equal to or less than the threshold time t1. In other words, before pixel aging caused by overdriving occurs, the above brightness adjustment module may automatically restore the operation current before pixel aging due to overdriving occurs.

Figure 5:
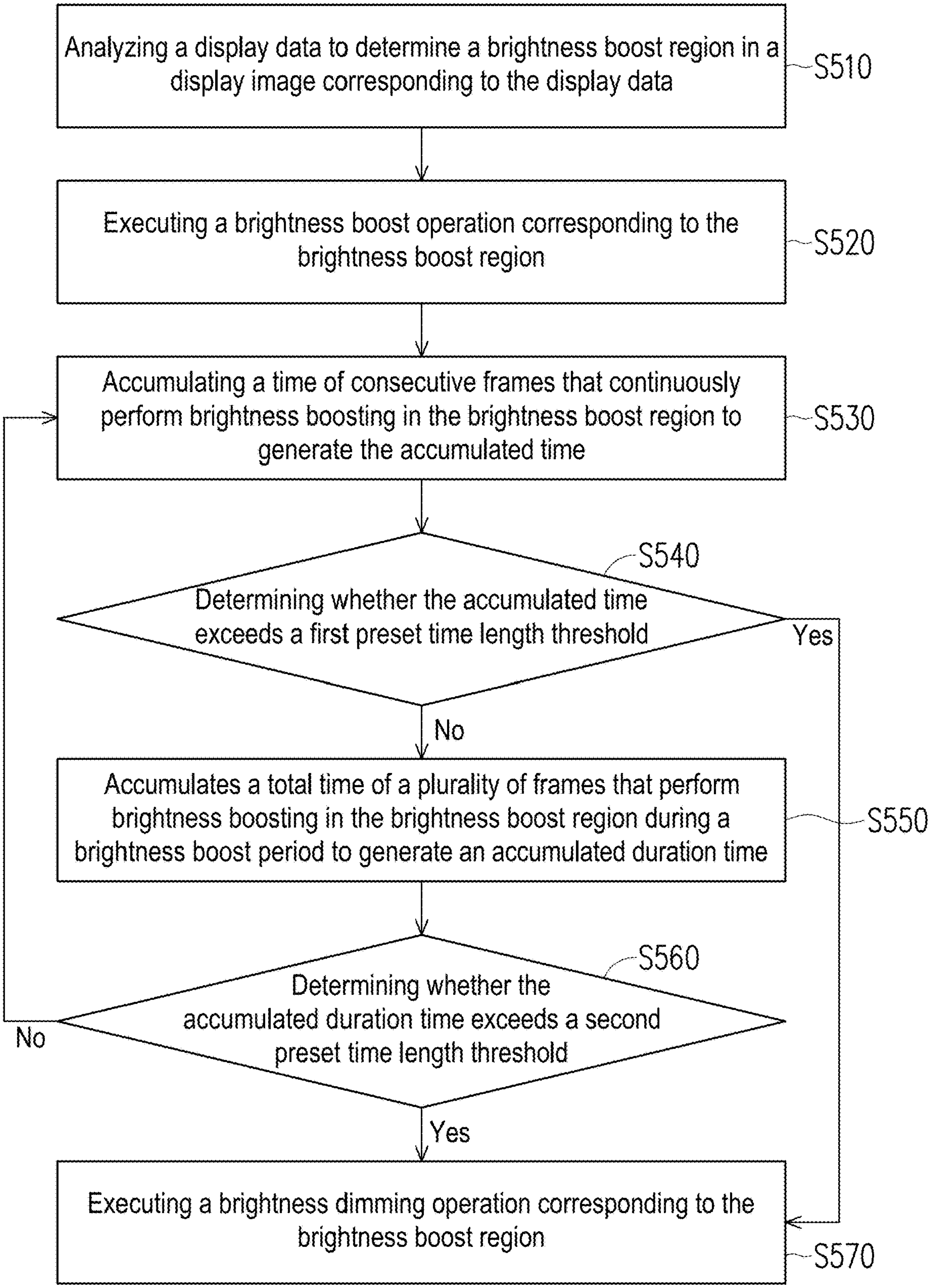
FIG. 5 is a flowchart of another display driving method according to an embodiment of the disclosure.

FIG. 5 is a flowchart of another display driving method according to an embodiment of the disclosure. Referring to FIG. 1 and FIG. 5, the display driving device 100 may execute the following steps S510-S570. In the embodiment of the disclosure, the display driving device 100 may receive the display data. In step S510, the image analysis module 110 may analyze a display data 101 to determine a brightness boost region in a display image corresponding to the display data 101. In step S520, the brightness adjustment module 120 may execute a brightness boost operation corresponding to the brightness boost region. In step S530, the brightness adjustment module 120 may accumulate a time of consecutive frames that continuously perform brightness boosting in the brightness boost region to generate the accumulated time.

In step S540, the brightness adjustment module 120 may determine whether the accumulated time exceeds a first preset time length threshold. If yes, in step S570, the brightness adjustment module 120 may execute a brightness dimming operation corresponding to the brightness boost region. If no, in step S550, the brightness adjustment module 120 may further accumulate a total time of a plurality of frames (may be non-consecutive frames) that perform brightness boosting in the brightness boost region during a brightness boost period to generate an accumulated duration time.

In step S560, the brightness adjustment module 120 may further determine whether the accumulated duration time exceeds a second preset time length threshold. If yes, in step S570, the brightness adjustment module 120 may execute a brightness dimming operation corresponding to the brightness boost region. If no, the brightness adjustment module 120 may execute step S530 to continuously accumulate the time of consecutive frames that continuously perform brightness boosting and continuously accumulate the total time of the plurality of frames (may be non-consecutive frames) that perform brightness boosting. In one embodiment of the disclosure, the second preset time length threshold may be equal to or greater than the first preset time length threshold. In addition, regarding the specific implementation content of the brightness boosting operation and the brightness dimming operation in this embodiment, reference can be made to the descriptions of the above embodiments.

Therefore, the display driving device 100 may effectively control the time length of the brightness boost period when the display device 200 displays the display image 300, thereby effectively avoiding the accelerated aging of pixels caused by continuous or non-continuous over-driving.

In summary, the display driving device and the display driving method of the disclosure may effectively control the brightness boosting time length of the brightness boosting operation on the displayed image by the display device to effectively maintain the luminous efficiency of the pixels in the panel of the display device. The display driving device and the display driving method of the disclosure may effectively avoid the accelerated aging of pixels caused by continuous or non-continuous over-driving. The display driving device and the display driving method of the disclosure may implement an effective brightness boost time limit function for controlling the display device.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display driving device, comprising:

an image analysis module, configured to analyze a display data to determine a brightness boost region in a display image corresponding to the display data; and a brightness adjustment module, coupled to the image analysis module, wherein the brightness adjustment module is configured to execute a brightness boost operation corresponding to the brightness boost region, and the brightness adjustment module is configured to calculate an accumulated time of the brightness boost operation, wherein when the brightness adjustment module determines the accumulated time exceeds a first preset time length threshold, the brightness adjustment module is configured to execute a brightness dimming operation corresponding to the brightness boost region.

2. The display driving device according to claim 1, wherein the image analysis module determines whether the display image satisfies a brightness boost condition to define at least a part of the display image as the brightness boost region.

3. The display driving device according to claim 2, wherein when the image analysis module judges a number of pixels in the display image with grayscale values higher than a preset grayscale value is higher than a preset number threshold, the image analysis module determines the display image satisfies the brightness boost condition and defines a region with grayscale values higher than the preset grayscale value as the brightness boost region.

4. The display driving device according to claim 1, wherein when the brightness adjustment module executes the brightness boost operation, the brightness adjustment module increases operation currents for driving pixels on at least a portion of a display panel corresponding to the brightness boost region.

5. The display driving device according to claim 4, wherein when the brightness adjustment module executes the brightness dimming operation, the brightness adjustment module reduces the operation currents for driving pixels on the at least a portion of the display panel corresponding to the brightness boost region to normal currents.

6. The display driving device according to claim 1, wherein the brightness adjustment module accumulates a time of consecutive frames that continuously perform brightness boosting in the brightness boost region to generate the accumulated time.

7. The display driving device according to claim 1, wherein the brightness adjustment module further accumulates a total time of a plurality of frames that perform brightness boosting in the brightness boost region during a brightness boost period to generate an accumulated duration time, wherein when the brightness adjustment module determines the accumulated duration time exceeds a second preset time length threshold, the brightness adjustment module executes the brightness dimming operation corresponding to the brightness boost region.

8. The display driving device according to claim 1, wherein during a period of the brightness dimming operation, brightness of the brightness boost region in the display image is gradually reduced to normal brightness.

9. A display driving method, comprising:

analyzing a display data to determine a brightness boost region in a display image corresponding to the display data;

executing a brightness boost operation corresponding to the brightness boost region;

calculating an accumulated time of the brightness boost operation; and when the accumulated time exceeds a first preset time length threshold, executing a brightness dimming operation corresponding to the brightness boost region.

10. The display driving method according to claim 9, wherein the step of determining the brightness boost region comprises:

determining whether the display image satisfies a brightness boost condition to define at least a part of the display image as the brightness boost region.

11. The display driving method according to claim 10, wherein the step of determining whether the display image satisfies the brightness boost condition comprises:

when a number of pixels in the display image with grayscale values higher than a preset grayscale value is higher than a preset number threshold, determining the display image satisfies the brightness boost condition and defines a region with grayscale values higher than the preset grayscale value as the brightness boost region.

12. The display driving method according to claim 9, wherein the brightness boost operation comprises:

increasing operation currents for driving pixels on at least a portion of a display panel corresponding to the brightness boost region.

13. The display driving method according to claim 12, wherein the brightness dimming operation comprises:

reducing the operation currents for driving pixels on the at least a portion of the display panel corresponding to the brightness boost region to normal currents.

14. The display driving method according to claim 9, wherein the step of calculating the accumulated time of the brightness boost operation comprises:

accumulating a time of consecutive frames that continuously perform brightness boosting in the brightness boost region to generate the accumulated time.

15. The display driving method according to claim 9, further comprising:

accumulating a total time of a plurality of frames that perform brightness boosting in the brightness boost region during a brightness boost period to generate an accumulated duration time;

when the accumulated duration time exceeds a second preset time length threshold, executing the brightness dimming operation corresponding to the brightness boost region.

16. The display driving method according to claim 9, wherein during a period of the brightness dimming operation, brightness of the brightness boost region in the display image is gradually reduced to normal brightness.

* * * * *